US 7,982,783 B2

(12) United States Patent
Izawa

(10) Patent No.: US 7,982,783 B2
(45) Date of Patent: Jul. 19, 2011

(54) SYSTEM FOR AND METHOD OF IMAGE PROCESSING AND COMPUTER PROGRAM FOR CAUSING COMPUTER TO EXECUTE THE METHOD

(75) Inventor: Katsutoshi Izawa, Kurokawa-gun (JP)

(73) Assignee: Fujifilm Corporation, Tokyo (JP)

( * ) Notice: Subject to any disclaimer, the term of this patent is extended or adjusted under 35 U.S.C. 154(b) by 502 days.

(21) Appl. No.: 12/105,662

(22) Filed: Apr. 18, 2008

(65) Prior Publication Data
US 2008/0259187 A1 Oct. 23, 2008

(30) Foreign Application Priority Data
Apr. 18, 2007 (JP) ................ 2007-109340

(51) Int. Cl.
H04N 5/217 (2006.01)
(52) U.S. Cl. ................ 348/241; 382/275
(58) Field of Classification Search .......... None
See application file for complete search history.

(56) References Cited

U.S. PATENT DOCUMENTS
6,832,008 B1* 12/2004 Wada ............... 382/275
2002/0048411 A1* 4/2002 Takayama et al. ........ 382/275
2002/0131649 A1* 9/2002 Yamaguchi ............ 382/275
2006/0132642 A1* 6/2006 Hosaka et al. ............ 348/370
2006/0268110 A1* 11/2006 Koike et al. ............. 348/159
2007/0103594 A1* 5/2007 Zhu et al. ............... 348/607
2007/0188650 A1* 8/2007 Kobayashi et al. ......... 348/344

FOREIGN PATENT DOCUMENTS
JP 6-141247 A 5/1994
JP 2004-260320 A 9/2004

OTHER PUBLICATIONS

Carlo Tomasi, et al, "Shape and Motion from Image Streams: A Factorization Method-Part 3, Detection and Tracking of Point Features", Technical Report CMU-CS-91-132, Apr. 1991, 22 pages.
Carlo Tomasi, et al, "Shape and Motion from Image Streams: A Factorization Method, Full Report on the Orthographic Case", Cornell TR 92-1270 and Carnegie Mellon CMU-92-104, Mar. 1992, 9 pages.

* cited by examiner

Primary Examiner — Nhan T Tran
Assistant Examiner — Dennis Hogue
(74) Attorney, Agent, or Firm — Sughrue Mion, PLLC

(57) ABSTRACT

An image processing apparatus includes an edge detecting portion which detects edges contained in a first image, out of first and second images representing the same object, one being obtained by photographing without the infrared ray cut filter, the other being obtained by photographing with the infrared ray cut filter, and a noise reduction portion which carries out noise reduction processing on the second image to avoid the edges and obtains a processed image.

13 Claims, 8 Drawing Sheets

| N | N | N | N | N |
|---|---|---|---|---|
| N | N | N | NE | H |
| N | N | NE | NE | N |
| N | N | V | N | N |

SYSTEM FOR AND METHOD OF IMAGE PROCESSING AND COMPUTER PROGRAM FOR CAUSING COMPUTER TO EXECUTE THE METHOD

BACKGROUND OF THE INVENTION

1. Field of the Invention

This invention relates to a system for and a method of image processing where noises included in an image obtained by photographing are reduced, and a computer program for causing a computer to execute the method.

2. Description of the Related Art

There has been known a digital camera in which an infrared ray cut filter is retractably inserted into the optical path of a taking system such as a CCD to eliminate the light in an infrared region from the incident light so that the photographing can be carried out both with and without the infrared ray cut filter (See Japanese Unexamined Patent Publication No. 6 (1994)-141247). Since the CCD is sensitive to light in the infrared region, the reproduced color becomes reddish and cannot be faithful to the object when all the light from the object is imaged on the CCD. Accordingly, in such a camera, the photographing is carried out with the infrared ray cut filter in the normal photographing. Conversely, since the amount of the electric signal obtained from the CCD is reduced and S/N is reduced to largely increase the amount of noise if the amount of environmental light is poor and the amount of light impinging upon the CCD is reduced when the infrared ray cut filter is used. Accordingly, the photographing is carried out without the infrared ray cut filter in the photographing under a poor environmental light. Further, by handling an image obtained by such a photographing as a monochromatic image, reduction in the sensitivity is prevented by the use of light in a wavelength range invisible to the human eyes.

In the digital camera disclosed in Japanese Unexamined Patent Publication No. 6 (1994)-141247, use and unuse of the infrared ray cut filter are switched according to the amount of environmental light. However, in the digital camera disclosed in Japanese Unexamined Patent Publication No. 2004-260320, the use and the unuse of the infrared ray cut filter are switched according to information on the time, weather, halation and the like of the photographing. In the digital camera, the normal color photographing and the high-sensitive photographing can be automatically switched. Though the CCD has been increased in the number of pixels and the sensitivity, the problem of the noises included in an image obtained by photographing becomes more serious as the sensitivity becomes higher. Accordingly, there have been proposed various techniques to reduce the noises included in an image obtained by photographing. For example, there has been proposed a technique to reduce the noises included in an image obtained by detecting edges from the image obtained by photographing and carrying out the filtering with a low-pass filter to avoid the detected edges. With this technique, the noises included in an image obtained can be reduced without blurring the edges.

However, in the image obtained by the high-sensitive photographing, there are included very lots of noises and at the same time, the noise signal is sometimes larger in the amplitude than the edge signal included in the image, whereby it becomes difficult to distinguish the noise and the edge from each other. When the noise and the edge cannot be distinguished from each other, it is impossible to avoid the edges when the noises are reduced. Accordingly, the edges of the image can be blurred due to the noise reduction processing.

SUMMARY OF THE INVENTION

In view of the foregoing observations and description, the primary object of the present invention is to accurately detect the edges from an image and obtain an image reduced with noises.

In a first aspect of the present invention, there is provided a first image processing apparatus comprising an edge detecting means which detects edges contained in a first image, out of first and second images representing the same object, one being obtained by photographing without the infrared ray cut filter, the other being obtained by photographing with the infrared ray cut filter, and a noise reduction means which carries out noise reduction processing on the second image to avoid the edges and obtains a processed image.

In this specification, "to avoid the edges" means not only "not to carry out the noise reduction processing on the edges" but also "to weaken the noise reduction processing on the edges as compared with portions other than the edges".

In the first image processing apparatus of the present invention, when the image data representing the first image comprises red (R), green (G), and blue (B) data, the edge detecting means may comprise means for detecting the edges from an image represented at least one of the brightness data and two color difference data generated from the RGB data.

In a second aspect of the present invention, there is provided a second image processing apparatus comprising an edge detecting means which detects edges as first and second edge information contained in first and second images representing the same object, one being obtained by photographing without the infrared ray cut filter, the other being obtained by photographing with the infrared ray cut filter, a difference detecting means which detects a difference of the images at the corresponding points in the first and second images and a noise reduction means which carries out noise reduction processing on the second image according to the first and second edge information and existence of the difference of the images in the first image, and obtains a processed image.

In the second image processing apparatus of the present invention, the noise reduction means may comprise a means which carries out the noise reduction processing on the second image to avoid the edges based on the first edge information where it may be considered that there is no difference of the images in the second image and carries out the noise reduction processing on the second image to avoid the edges based on the second edge information where it may be considered that there is a difference of the images in the second image.

Further, in the second image processing apparatus of the present invention, the difference detecting means may comprise a means which detects the absolute value of the difference of the pixels at the corresponding points in the first and second images as the difference of the images.

Further, in the second image processing apparatus of the present invention, when the image data representing the first and second images comprises RGB data, the edge detecting means may comprise means for detecting the edges from an image represented at least one of the brightness data and two color difference data generated from the RGB data.

Further, in the second image processing apparatus of the present invention, the first and second images may be obtained at the same shutter speed.

In this case, when the image data representing the first and second images comprises RGB data, the difference detecting means may comprise a means which detects the difference on the basis of the B color data.

In a third aspect of the present invention, there is provided a third image processing apparatus, comprising an edge detecting means which detects edges contained in a first image, out of first and second images representing the same object, one being obtained by photographing without the infrared ray cut filter, the other being obtained by photographing with the infrared ray cut filter, a movement detecting means which detects movement of the first and second images, an edge correcting means which corrects a position of the edges on the basis of the movement, and a noise reduction means which carries out noise reduction processing on the second image to avoid the edges in a corrected position and obtains a processed image.

In the third image processing apparatus of the present invention, when the image data representing the first image comprises RGB data, the edge detecting means may comprise means for detecting the edges from an image represented at least one of the brightness data and two color difference data generated from the RGB data.

Further, in the third image processing apparatus of the present invention, the first and second images may be obtained at the same shutter speed.

In this case, when the image data representing the first and second images comprises RGB data, the movement detecting means may comprise a means which detects the movement on the basis of the B color data.

The image taking apparatus of the present invention comprises an image taking means which obtains an image by photographing, a filter switching means which moves into and away from the optical axis of the image taking means, a control means which controls the image taking means and the filter switching means to obtain first and second images representing the same object, one being obtained by photographing without the infrared ray cut filter, the other being obtained by photographing with the infrared ray cut filter, and any one of the first to third image processing apparatus of the present invention.

In a fourth aspect of the present invention, there is provided a first image processing method comprising the steps of detecting an edge contained in a first image, out of first and second images representing the same object, one being obtained by photographing without the infrared ray cut filter, the other being obtained by photographing with the infrared ray cut filter, carrying out noise reduction processing on the second image to avoid the edges, and obtaining a processed image.

In a fifth aspect of the present invention, there is provided a second image processing method comprising the steps of detecting edges as first and second edge information contained in first and second images representing the same object, one being obtained by photographing without the infrared ray cut filter, the other being obtained by photographing with the infrared ray cut filter, detecting a difference of the images at the corresponding points in the first and second images and carrying out noise reduction processing on the second image according to the first and second edge information and existence of the difference of the images in the first image, and obtaining a processed image.

In a sixth aspect of the present invention, there is provided a third image processing method comprising the steps of detecting edges contained in a first image, out of first and second images representing the same object, one being obtained by photographing without the infrared ray cut filter, the other being obtained by photographing with the infrared ray cut filter, detecting movement of the first and second images, correcting a position of the edges on the basis of the movement, and carrying out noise reduction processing on the second image to avoid the edges in a corrected position and obtaining a processed image.

The first to third image processing methods of the present invention may be provided as a computer-readable medium on which procedure of the first to third image processing methods of the present invention are respectively recorded.

A skilled artisan would know that the computer readable medium is not limited to any specific type of storage devices and includes any kind of device, including but not limited to CD's, floppy disks, RAM's, ROM's, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

In accordance with the first image processing apparatus and method of the present invention, the edges contained in a first image, obtained by photographing without the infrared ray cut filter and the noise reduction processing is carried out on the second image obtained by photographing with the infrared ray cut filter, to avoid the edges.

Though the first image obtained by photographing without the infrared ray cut filter is high in sensitivity and is less in noise since it includes the wavelength region invisible to the human eyes, it is reddish in its image and it cannot correctly reproduce the color of the object. On the hand, the second image obtained by photographing with the infrared ray cut filter can correctly reproduce the color of the object though more in noise since it is less in amount of light impinging on the image taking element.

In the first image processing apparatus and method of the present invention, the edges are detected from the first image. Accordingly, the edges can be accurately detected without affected by the noise. And the noise reduction processing can be carried out on the second image to certainly avoid the edges. As a result, a processed image in which the noises are reduced can be obtained without blurring the edges.

In accordance with the second image processing apparatus and method of the present invention, the edges contained in first and second images representing the same object, one being obtained by photographing without the infrared ray cut filter, the other being obtained by photographing with the infrared ray cut filter are detected as first and second edge information and a difference of the images at the corresponding points in the first and second images is detected. Then the noise reduction processing is carried out on the second image according to the first and second edge information and existence of the difference of the images.

Here, since the first and second images are obtained by photographing without the infrared ray cut filter and with the infrared ray cut filter which is moved away and into the optical axis of the image taking means and there is generated a time lag between the photographings, the object can be moved between the first and second images. Since the edges are different in the first and second images when the object is moved in this manner, if the noise reduction processing is carried out on the second image to avoid the edges detected in the first image, there is a fear to carry out the noise reduction processing on the edges in the second image.

In the parts of the first and second images where the object is not moved, there is generated no difference between the first and second images, whereas in the parts of the first and second images where the object is moved, there is generated a difference between the first and second images. In accordance with the second image processing apparatus and method of the present invention, since the noise reduction processing is carried out on the second image according to the first and second edge information and existence of the difference of the images, while the edges can be accurately detected by the use of the first image, the noise reduction processing can be carried out on the second image to avoid the edges contained in the second image even if the object is moved. Accordingly, a processed image in which the noises are reduced can be obtained without blurring the edges.

In accordance with the third image processing apparatus and method of the present invention, the edges are detected from the first image obtained by photographing without the infrared ray cut filter, movement of the first and second images are detected, and the position of the edges is corrected on the basis of the movement, and noise reduction processing is carried out on the second image to avoid the edges in a corrected position.

Here, since the first and second images are obtained by photographing without the infrared ray cut filter and with the infrared ray cut filter which is moved away and into the optical axis of the image taking means and there is generated a time lag between the photographings, the object can be moved between the first and second images. Since the edges are different in the first and second images when the object is moved in this manner, if the noise reduction processing is carried out on the second image to avoid the edges detected in the first image, there is a fear to carry out the noise reduction processing on the edges in the second image.

In accordance with the third image processing apparatus and method of the present invention, the position of the edges is corrected on the basis of the movement of the first and second images, and noise reduction processing is carried out on the second image to avoid the edges in a corrected position. Accordingly, while the edges can be accurately detected by the use of the first image, the noise reduction processing can be carried out on the second image to avoid the edges contained in the second image even if the object is moved. Accordingly, a processed image in which the noises are reduced can be obtained without blurring the edges.

BRIEF DESCRIPTION OF THE DRAWINGS

FIG. 6 is a view showing an example of an image of edges, FIG. 7 are views showing examples of the low-pass filter.

DESCRIPTION OF THE PREFERRED EMBODIMENT

Figure 1:
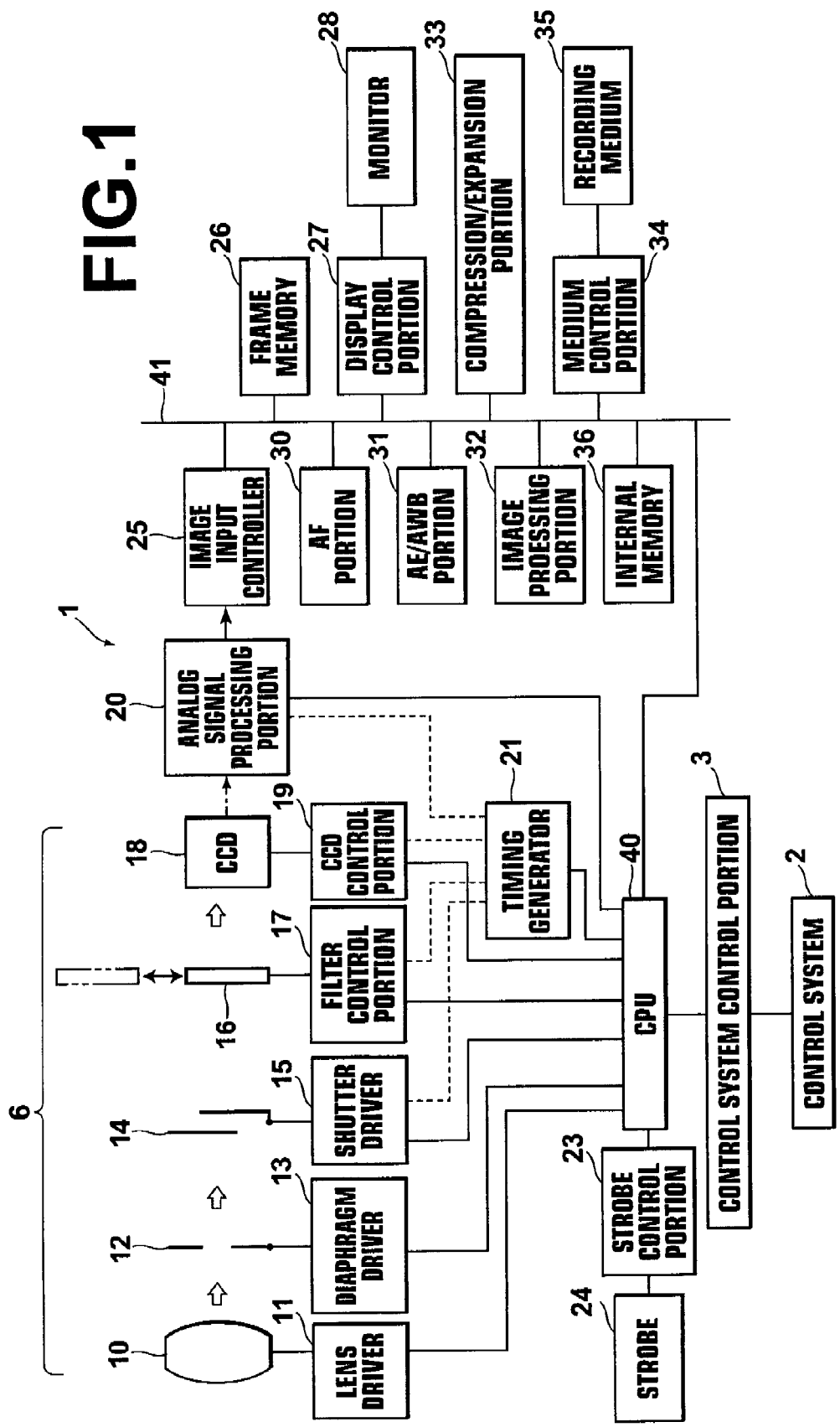
FIG. 1 is a block diagram showing a digital camera to which an image processing system in accordance with a first embodiment of the present invention is applied.

The embodiments of the present invention will be described with reference to the drawings, hereinbelow. FIG. 1 is a block diagram showing a digital camera to which an image processing system in accordance with a first embodiment of the present invention is applied. As shown in FIG. 1, the digital camera 1 of this embodiment has a control system 2 comprising an action mode switch, a zoom lever, an up and down/right and left button, shutter release button, power switch and the like and a control system control portion 3 which is an interface for transmitting the contents of control by the control system 2 to the CPU 40.

As the image taking system 6, the digital camera 1 of this embodiment has a taking lens 10 comprising a focusing lens and a zoom lens. The focusing lens and the zoom lens making up the taking lens 10 are movable in the direction of the optical direction by a lens drive portion 11 comprising a motor and a motor driver.

A diaphragm 12 is driven by a diaphragm driver 13 comprising an electric motor and a motor driver. The diaphragm driver 13 adjusts the diameter of the diaphragm 12 on the basis of diaphragm data output from an AE/AWB portion 31.

Shutter 14 is a mechanical shutter and is driven by a shutter driver 15 comprising an electric motor and a motor driver. The shutter driver 15 controls open/closure of the shutter 14 on the basis of a depression signal of the shutter release button and shutter speed data output from the AE/AWB portion 31.

Behind the shutter 14, an infrared ray cut filter 16 is provided. The infrared ray cut filter 16 can be moved into and away from the optical axis of the image taking system 6 by a filter driver 17 comprising a known slide mechanism.

Behind infrared ray cut filter 16, a CCD 18 which is an image-taking element is provided. The CCD 18 has a photoelectric surface comprising a lot of two-dimensionally arranged light receiving elements, and an image of the object passing through the optical system is imaged on the photoelectric surface to be photoelectrically converted. Forward of the photoelectric surface, there are disposed a micro-lens array (not shown) for collecting light on each of the pixels and a color-filter array (not shown) comprising a lot of red filters, green filters and blue filters which are regularly arranged. The CCD 18 outputs line by line electric charges accumulated by the pixels as a serial analog image signal in synchronization with vertical and horizontal clock signals supplied from a CCD control portion 19. The electric charge accumulating time of each pixel, that is, the exposure time, is determined by an electronic shutter-drive signal given by the CCD control portion 19. The CCD 18 has been adjusted in its gain by the CCD control portion 19 to obtain an analog image signal of a predetermined amplitude.

The image signal output by the CCD 18 is input into an analog signal processing portion 20. The analog signal processing portion 20 comprises a correlation double sampling circuit (CDS) for removing noise of the image signal, an auto-gain controller (AGC) for adjusting the gain of the image signal and an A/D converter (ADC) for converting the image signal to a digital image data. The digital image data is a CCD-RAW data having RGB density values by each of the pixels.

A timing generator 21 generates timing signals, and the timing signals are input into the shutter driver 15, the filter driver 17, the CCD control portion 19 and the analog signal processing portion 20 to synchronize operation of the shutter release button, open and closure of the shutter 16, the movement of the infra red ray cut filter into and away from the optical axis, taking in the charges of the CCD 18 and processing of the analog signals.

A strobe control portion 23 emits light from a strobe light 24 upon photographing.

An image input controller 25 writes, in a frame memory 26, the CCD-RAW data input from the analog signal processing portion 20.

The frame memory 26 is a working memory for use when each of various image processing (signal processing) to be described later is to be carried out on the image data, and comprises, for instance, an SDRAM (synchronous dynamic random access memory) which transfers data in synchronization with bus clock signals of a constant period.

A display control portion 27 is for displaying on the monitor 28, image data stored in the frame memory 26 as a through image, and stored in a recording medium upon reproduction. The through images are continuously photographed by the CCD 18 at predetermined time intervals while the photographing mode is selected. The AF portion 30 and the AE/AWB portion 31 determine the photographing condition on the basis of a pre-image. The pre-image is an image represented by image data stored in the frame memory 26 as a result when the CPU 40 which has detected a semi-depression signal generated in response to a semi-depression of the shutter release button causes the CCD 18 to execute the pre-photographing.

The AF portion 30 determines the focusing position on the basis of the pre-image and outputs the data on the amount of drive of the focusing lens (AF processing). The focusing position may be determined, for instance, on the basis of a passive system where the characteristics that the contrast of the image is increased when a desired object is in focus are used.

The AE/AWB portion 31 measures brightness of the object on the basis of the pre-image and determines ISO sensitivity, opening degree of diaphragm, shutter speed and the like on the basis of the measured brightness of the object, thereby determining ISO sensitivity data, diaphragm data and, shutter speed data as exposure setting values (AE processing) and automatically adjusts the white balance upon photographing (AWB processing). The exposure and the white balance can be manually set by the photographer of the digital camera 1 when the photographing mode is set in the manual mode. Even if the exposure and the white balance are automatically set, the exposure and the white balance can be manually set by the photographer of the digital camera 1.

Further, the AE/AWB portion 31 sets the same shutter speed in the first and second photographings to be described later.

Figure 2:
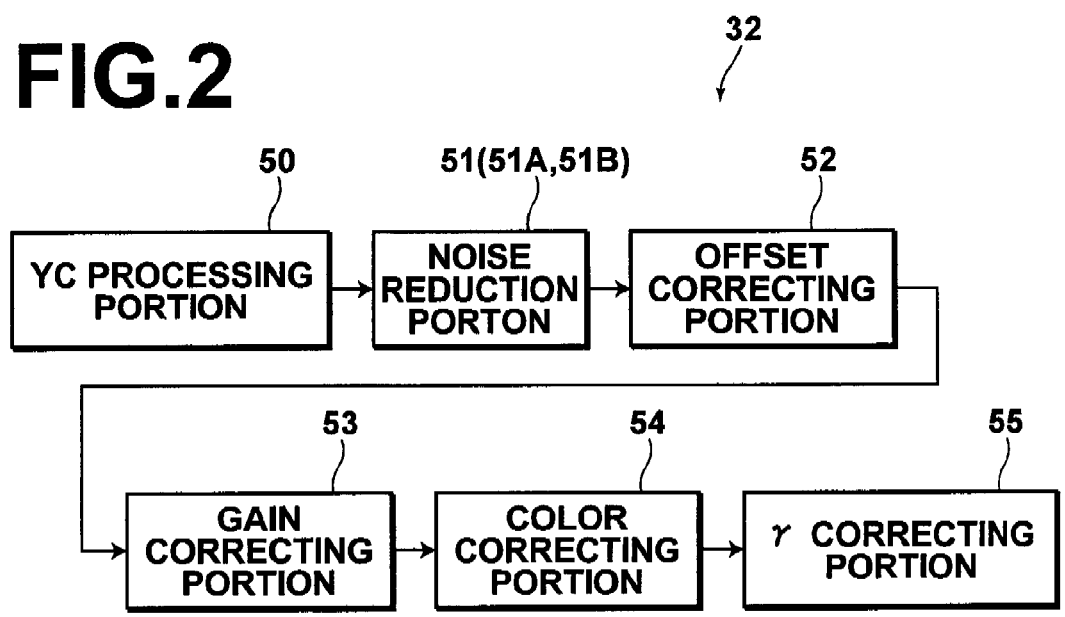
FIG. 2 is a block diagram showing the image processing portion.

FIG. 2 shows an image processing section 32. As shown in FIG. 2, the image processing portion 32 comprises a YC processing portion 50, a noise reduction portion 51, an offset correction portion 52, a gain correction portion 53, a color correction portion 54 and a γ-correction portion 55, and first carries out in the YC processing portion 50 color-interpolation of CCD-RAW data of the running image and the YC processing where the CCD-PAW data comprising RGGB data is converted to YC data comprising Y data which is a luminance signal, Cb data which is a blue difference signal and Cr data which is a red difference signal. Further, the noise reduction processing, the offset correction processing, the color correction processing and the γ-correction processing are carried out by the use of the YC data.

Though this embodiment is featured by processing to be executed in the noise reduction portion 51, the processing to be executed in the noise reduction portion 51 will be described later.

"This running image" is an image based on image data which is taken in from the CCD 58 in response to running image taking executed in response to full-depression of the shutter release button and has been stored in the frame memory 26 by way of the analog signal processing portion 20 and the image input controller 25.

A compression/expansion processing portion 33 compresses, for instance, in JPEG format, image data of the running image which has been processed by the image processing portion 32 and generates an image file. To this image file, a tag on which information such as date of photographing is recorded on the basis of Exif format is attached. This compression/expansion processing portion 33, in a reproduction mode, reads out the compressed image file from the recording medium 35 and expands it. Expanded image data is output to the monitor 28, and an image of the image data is displayed on the monitor 28.

A medium control portion 34 accesses the recording medium 35 to write and read the image file.

The internal memory 36 stores various constants and programs to be executed by the CPU 40 which are set in the digital camera 1.

The CPU 40 controls each element of the digital camera 1 according to signals from the various processing portions such as the control system 2 and the AF portion 30. Further, the CPU 40 controls each element of the digital camera 1 so that twice photographings are continuously carried out in response to once shutter release action, in the first photographing, photographing being carried out with the infrared ray cut filter retracted away from the optical axis or without the infrared ray cut filter, in the second photographing, photographing being carried out with the infrared ray cut filter on the optical axis or with the infrared ray cut filter. With this arrangement, first and second images S1 and S2 are obtained in response to once shutter release action. The first and second images S1 and S2 are running images represented by CCD-RAW data and comprise RGB data.

A data bus 41 is connected to the processing portions, the frame memory 68, the CPU 40 and the like and each of the instructions and the pieces of digital image data is transmitted and received by way of the data bus 76.

With the structure described above, in the digital camera 1, the image processing portion 32 carries out the image processing on the CCD-RAW data of the running image obtained by the CCD 18 by the photographing, and further the compression/expansion processing portion 33 compresses the processed image data and the medium control portion 34 records the compressed image data on the recording medium 35.

Figure 3:
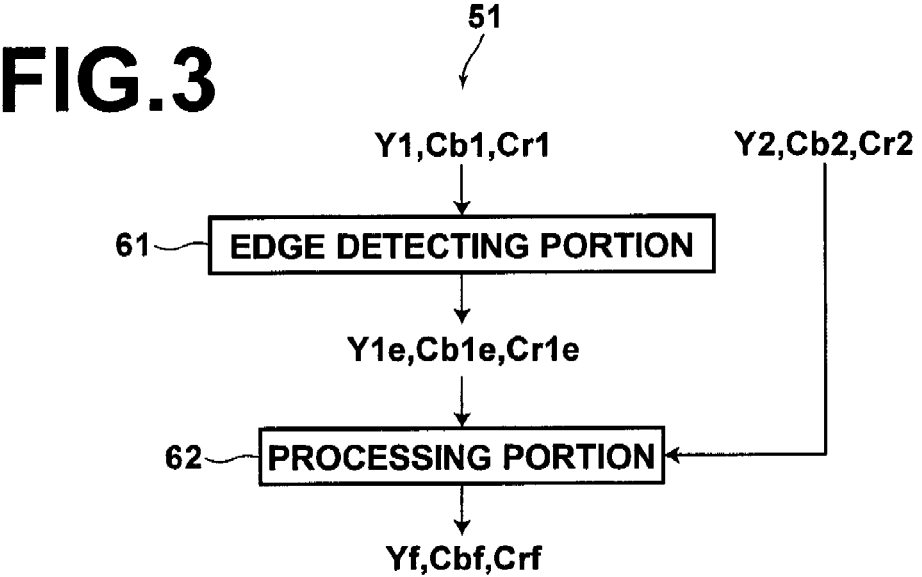
FIG. 3 is a block diagram showing the noise reduction portion of the first embodiment of the present invention.

The noise reduction processing executed in the first embodiment will be described in detail, hereinbelow. FIG. 3 is a block diagram showing the noise reduction portion 51 of the first embodiment of the present invention. As shown in FIG. 3, into the noise reduction portion 51 of the first embodiment, Y1 data, Cb1 data and Cr1 data obtained by carrying out the YC processing on the first image S1 and Y2 data, Cb2 data and Cr2 data obtained by carrying out the YC processing on the second image S2 are input, and comprises an edge detecting portion 61 and a processing portion 62.

Figure 4:
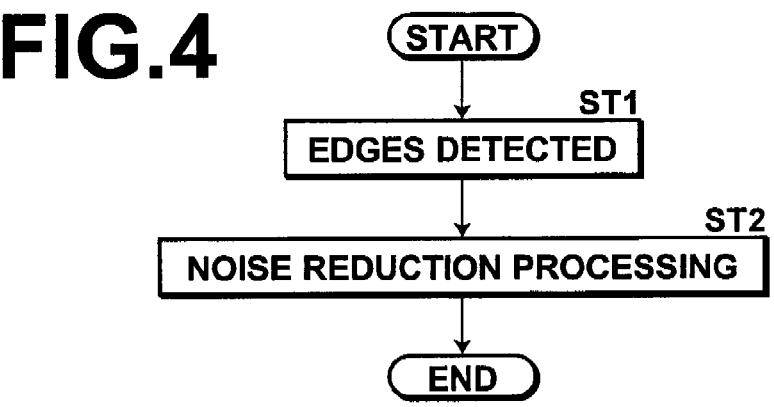
FIG. 4 is a flow chart showing the noise reduction processing to be executed in the first embodiment of the present invention, FIG. 5 are views showing examples of the high-pass filter.

FIG. 4 is a flowchart showing the noise reduction processing to be executed in the first embodiment of the present invention. In response to input of Y1 data, Cb1 data and Cr1 data and Y2 data, Cb2 data and Cr2 data into the noise reduction portion 51, the processing is started, and the edge detecting portion 61 detects the edges contained in Y1 image, Cb1 image, and Cr1 image represented by the Y1 data, Cb1 data and the Cr1 data to generate edge images Y1e, Cb1e, and Cr1e (step ST1).

Specifically, the edges contained in the Y1 image, Cb1 image, and the Cr1 image are detected by carrying out filtering with a high-pass filter on the Y1 image, Cb1 image, and the Cr1 image. FIG. 5 are views showing examples of the high-pass filter. The high-pass filters HP1 to HP4 are respectively for detecting edges in a vertical direction (V-direction), a horizontal direction (H-direction), a direction from the lower left to the upper right (NE-direction) and a direction from the lower right to the upper left (NW-direction). The coefficients of filter of the high-pass filters HP1 to HP4 need not be limited to those illustrated in FIG. 5.

The edge detecting portion 61 carries out filtering with the high-pass filters HP1 to HP4 on all the pixels of the Y1 image, Cb1 image, and the Cr1 image. Then the edge detecting portion 61 determines that no edge exists in the pixel the resulting outputs of the high-pass filters HP1 to HP4 for which are all not larger than a threshold value Th1 which is determined in advance. On the other hand, the edge detecting portion 61 determines that an edge exists in a direction determined by one of the high-pass filters HP1 to HP4, that is maximum in the resulting output, in the pixel the resulting outputs of one of the high-pass filters HP1 to HP4 for which is larger than the threshold value Th1. Accordingly, the edge detecting portion 61 determines that an edge exists in a V-direction determined by the high-pass filter HP1 when the high-pass filter HP1 is maximum in the resulting output, that an edge exists in a H-direction determined by the high-pass filter HP2 when the high-pass filter HP2 is maximum in the resulting output, that an edge exists in a NE-direction determined by the high-pass filter HP3 when the high-pass filter HP3 is maximum in the resulting output, and that an edge exists in a NW-direction determined by the high-pass filter HP4 when the high-pass filter HP4 is maximum in the resulting output.

FIG. 6 is a view showing an example of an image of edges. As shown in FIG. 6, an image of edges comprise pixels N which are determined to be free from the edge and pixels H, V, NE, NW (H, V, NE and NW represent direction of the edge when an edge is detected). For example, for the pixels which are determined to be free from the edge, the signal value is set to 0 and for the pixels which are determined that an edge exists, the signal value is set to 1 and information representing the direction of the edge is attached.

Then, the processing portion 62 carries out the noise reduction processing on the Y2 image, Cb2 image, and the Cr2 image represented by the Y2 data, Cb2 data and the Cr2 data to avoid the edges on the basis of the edge images Y1e, Cb1e, and Cr1e (step ST2) and the noise reduction processing is ended.

Specifically the processing portion 62 carries out the noise reduction processing on the Y2 image, Cb2 image, and the Cr2 image to avoid the edges contained in the Y2 image, Cb2 image, and the Cr2 image by carrying out filtering with a low-pass filter on the Y2 image, Cb2 image, and the Cr2 image. FIG. 7 are views showing examples of the low-pass filter. Low-pass filter LP0 is for the pixels which are determined to be free from the edge, and low-pass filters LP1 to LP4 are for the pixels which are determined that an edge exists in V-direction, H-direction, NE-direction and NW-direction, respectively. When the filtering is carried out with low-pass filters LP0 to LP4 in this manner, the pixels which are determined to be free from the edge are reduced with noises by being averaged. On the other hand, the pixels which are determined that an edge exists are reduced with noises without blurring the edge since the filtering processing is carried out in the direction in which the edge exists.

The coefficients of filter of the low-pass filters LP0 to LP4 need not be limited to those illustrated in FIG. 7.

On the Yf data, Cbf data, and the Crf data which have been processed with noise reduction the offset correction, color correction and the γ-correction are carried out in the offset correction portion 52, the gain correction portion 53, the color correction portion 54 and the γ-correction portion 55.

The compression/expansion processing portion 33 compresses the Yf data, Cbf data, and the Crf data processed by the image processing portion 32, for instance, in JPEG format, and generates an image file. The image file generated is recorded on the recording medium 35 by the medium control portion 34.

Though the first image S1 obtained by photographing without the infrared ray cut filter is high in sensitivity and is less in noise since it includes the wavelength region invisible to the human eyes, it is reddish in its image and it cannot correctly reproduce the color of the object. On the hand, the second image S2 obtained by photographing with the infrared ray cut filter can correctly reproduce the color of the object though more in noise since it is less in amount of light impinging on the CCD 18. In the first embodiment, the edges are detected from the first image S1. Accordingly, the edges can be accurately detected without affected by the noise. And the noise reduction processing can be carried out on the second image S2 to certainly avoid the edges. As a result, a processed image in which the noises are reduced can be obtained without blurring the edges.

Figure 8:
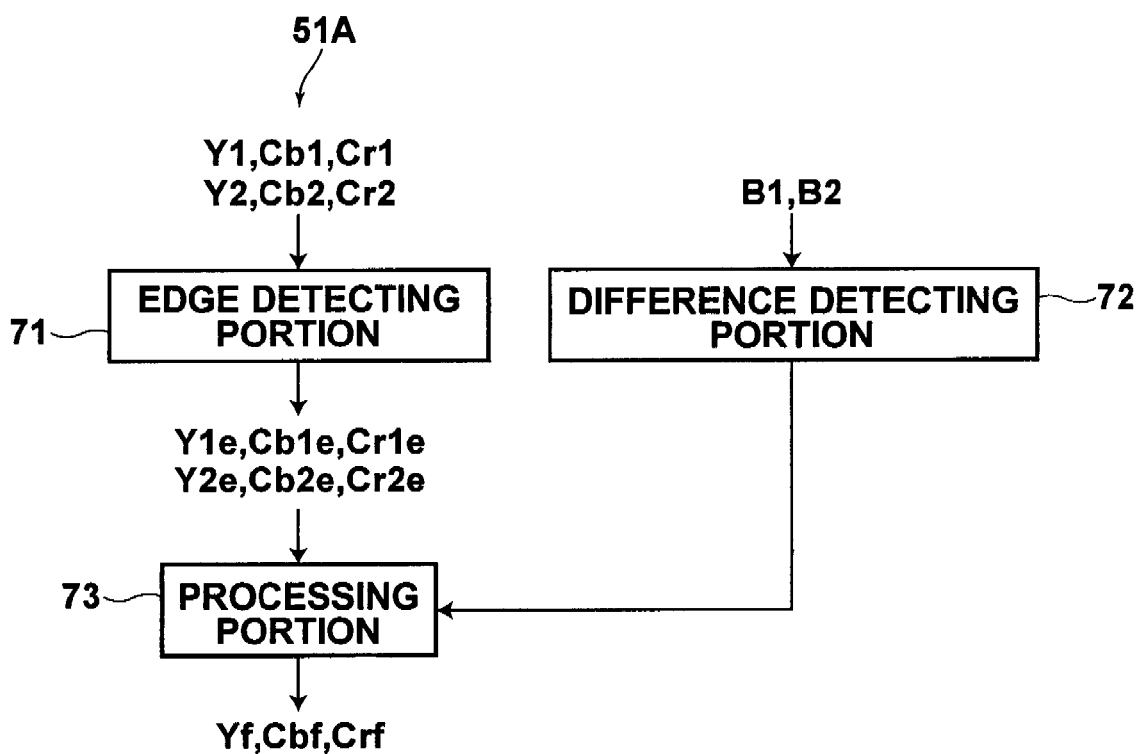
FIG. 8 is a block diagram showing the noise reduction portion of the second embodiment of the present invention.

A second embodiment of the present invention will be described, hereinbelow. Since the second embodiment differs from the first embodiment only in the structure of the noise reduction portion, the noise reduction portion will only be described in the following description. FIG. 8 is a block diagram showing the noise reduction portion of the second embodiment of the present invention. As shown in FIG. 8, into the noise reduction portion 51A in the second embodiment, Y1 data, Cb1 data, and Cr1 data obtained by YC-processing the first image S1, Y2 data, Cb2 data, and Cr2 data obtained by YC-processing the second image S2, and color data B1 of the B of the first image S1 and color data B2 of the B of the second image S2 before the YC-processing are input and the second embodiment comprises an edge detecting portion 71, a difference detecting portion 72 and a processing portion 73.

Figure 9:
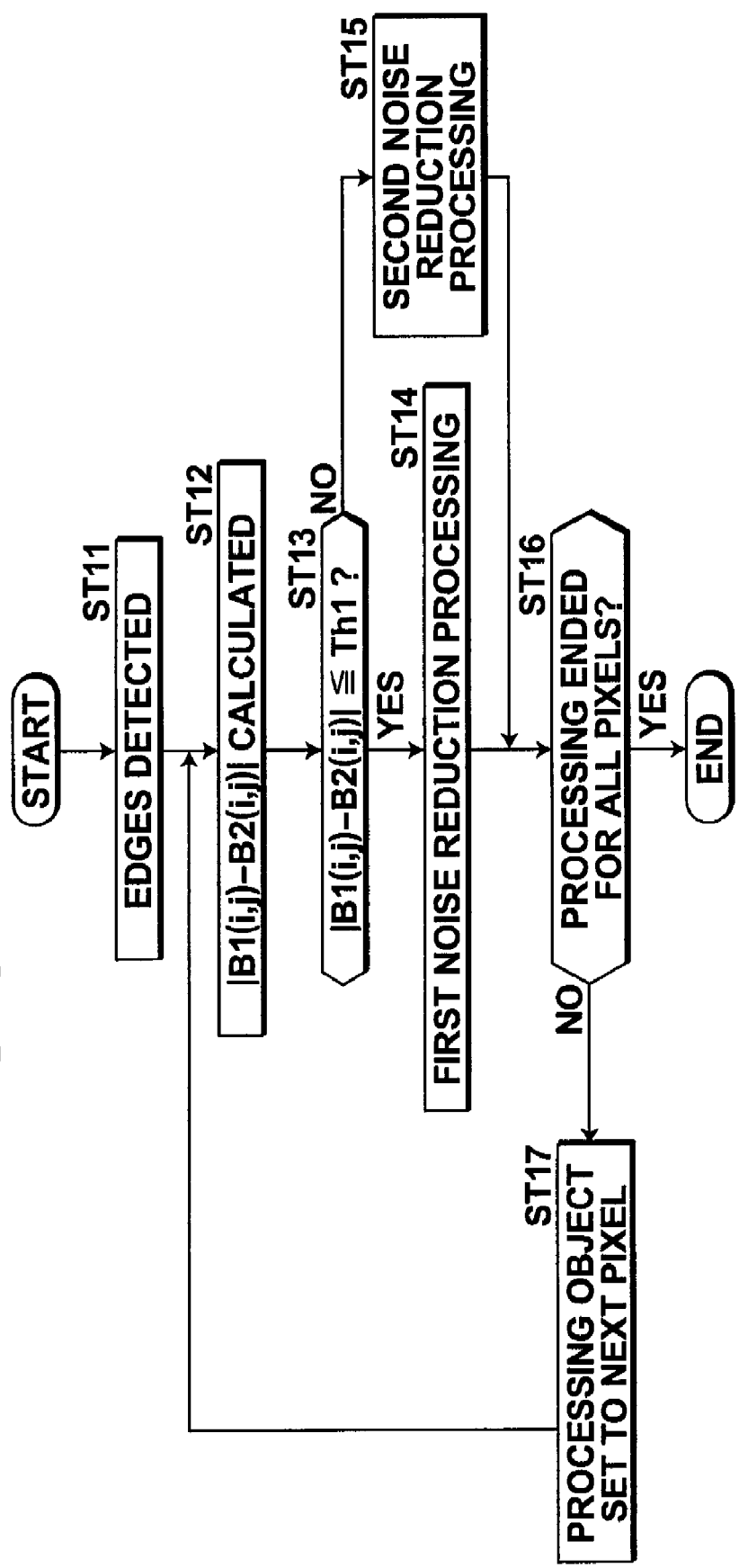
FIG. 9 is a flow chart showing the noise reduction processing to be executed in the second embodiment of the present invention.

The noise reduction processing executed by the noise reduction portion 51A in the second embodiment will be described, hereinbelow. FIG. 9 is a flow chart showing the noise reduction processing to be executed in the second embodiment of the present invention. In response to input of Y1 data, Cb1 data and Cr1 data and Y2 data, Cb2 data and Cr2 data, and color data B1 and color data B2 into the noise reduction portion 51A, the processing is started, and the edge detecting portion 71 detects the edges contained in Y1 image, Cb1 image, and Cr1 image and Y2 image, Cb2 image, and Cr2 image to generate edge images Y1e, Cb1e, Cr1e, Y2e, Cb2e, and Cr2e (step ST11).

The edges contained in the respective images can be detected by carrying out filtering with a high-pass filter as in the first embodiment. The second embodiment differs from the first embodiment in that the edge images Y2e, Cb2e, and Cr2e of the Y2 image, Cb2 image, and Cr2 image are further generated.

On the other hand, the difference detecting portion 72 detects the absolute value |B1$(i,j)$−B2$(i,j)$| of the difference of the pixel values at the corresponding points in the B1 and B2 images represented by B1 and B2 data (step ST12). (i,j) are the pixel values at the corresponding points in the B1 and B2 images and initially (1,1) ((i,j)=(1,1)).

Figure 10:
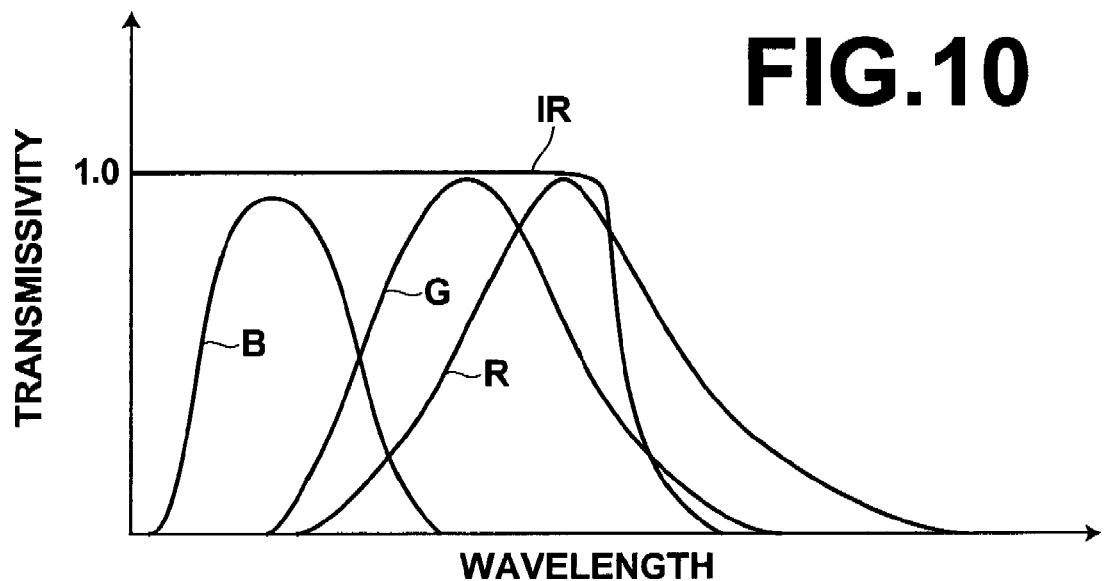
FIG. 10 is a view showing the transmission characteristics of each color of the RGB filters and of the infrared ray cut filter.

FIG. 10 is a view showing the transmission characteristics of each color of the RGB filters and of the infrared ray cut filter. In FIG. 10, transmissivity is 1.0 at most, and the curves R, G, B, and IR represents the transmission characteristics of each color of the RGB filters and of the infrared ray cut filter 16. As shown in FIG. 10, the wavelength region of light which the color filters of R and G transmits overlaps that which the infrared ray cut filter 16 transmits. Accordingly, when the shutter speed is the same in the first photographing where no infrared ray cut filter 16 is used, and in the second photographing where infrared ray cut filter 16 is used, the amount of light that reaches CCD 18 is different from each other between the first and second photographings. Conversely, since the wavelength region of light which the color filters of B transmits does not overlap that which the infrared ray cut filter 16 transmits, when the shutter speed is the same in the first and second photographings, the amount of light that reaches CCD 18 is the same between the first and second photographings.

Accordingly, when the B1 and B2 images are used in the difference detecting portion 72, the difference detecting portion 72 can accurately calculates the absolute value |B1$(i,j)$−B2$(i,j)$| of the difference of the pixel values at the corresponding points in the B1 and B2 images.

Then the processing portion 73 determines whether the absolute value |B1$(i,j)$−B2$(i,j)$| of the difference of the pixel values is not larger than a threshold value Th1 (step ST13). Since the first and second images S1 and S2 are photographed with the infrared ray cut filter switched on the optical axis of the image taking means and there is generated a time lag between the photographings, the object can be moved between the first and second images. For example, when a person waving his hand is the object, his hand is different in the position between the first and second images S1 and S2 as shown in FIG. 11.

Figure 11:
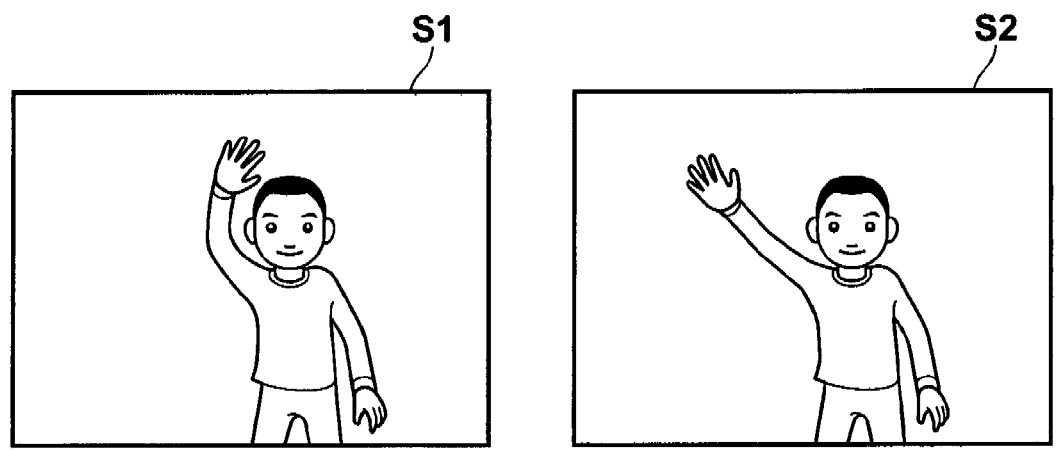
FIG. 11 is a view showing the movement of the object.

Accordingly, in the case of the first and second images S1 and S2 shown in FIG. 11, the absolute value |B1$(i,j)$−B2$(i,j)$| of the difference of the pixel values is not larger than the threshold value Th1 in the pixels other than those corresponding to the hand and is larger than the threshold value Th1 in the pixels corresponding to the hand. That the absolute value |B1$(i,j)$−B2$(i,j)$| of the difference of the pixel values is not larger than the threshold value Th1 means that the position of the edges is kept unchanged between the first and second images S1 and S2. Accordingly, when the step ST13 is affirmed, the processing portion 73 carries out the noise reduction processing to avoid the edges on the basis of the edge images Y1e, Cb1e, and Cr1e detected from the Y1 image, Cb1 image and the Cr1 image obtained from the photographing not with the infrared ray cut filter 16 on the Y2 image, Cb2 image and the Cr2 image as in the first embodiment (first noise reduction processing: step ST14).

On the other hand, that the absolute value |B1$(i,j)$−B2$(i,j)$| of the difference of the pixel values is larger than the threshold value Th1 means that the position of the edges is changed between the first and second images S1 and S2. In such a case, when the noise reduction processing is carried out to avoid the edges on the basis of the edge images Y1e, Cb1e, and Cr1e on the Y2 image, Cb2 image and the Cr2 image as in the first embodiment, there is a fear that the noise reduction processing is carried out on the parts of edge of the Y2 image, Cb2 image and the Cr2 image.

Accordingly, when the step ST13 is denied, the processing portion 73 carries out the noise reduction processing to avoid the edges on the basis of the edge images Y2e, Cb2e, and Cr2e detected from the Y2 image, Cb2 image and the Cr2 image obtained from the photographing with the infrared ray cut filter 16 on the Y2 image, Cb2 image and the Cr2 image as in the first embodiment (second noise reduction processing: step ST15).

Then, it is determined whether the noise reduction processing is ended for all the pixels (step ST16). When the step ST16 is denied, the processing is returned to step ST12 and step ST12 and the following steps are repeated on the next processing object (step ST17). When the step ST16 is affirmed, the noise reduction processing is ended.

In the second embodiment, when the absolute value |B1$(i,j)$−B2$(i,j)$| of the difference of the pixel values as calculated by the difference detecting portion 72 is not larger than the threshold value Th1, the noise reduction processing is carried out to avoid the edges on the basis of the edge images Y1e, Cb1e and Cr1e which are accurately detected without affected by the noises and when the absolute value |B1$(i,j)$−B2$(i,j)$| of the difference of the pixel values is larger than the threshold value Th1, the noise reduction processing is carried out to avoid the edges on the basis of the edge images Y2e, Cb2e and Cr2e which is superior to the edge images Y1e, Cb1e and Cr1e in accurately representing the position of edges in the second image S2 though affected by the noises in this manner. Accordingly, while the edges are accurately detected by the use of the first image S1, the noise reduction processing can be carried out to avoid the edges contained in the second image S2 even if the object is moved. As a result, a processed image in which the noises are reduced can be obtained without blurring the edges.

Though, in the second embodiment described above, the absolute value |B1$(i,j)$−B2$(i,j)$| of the difference of the values of the pixels in the corresponding position on the images B1 and B2 represented by B1 and B2 data is calculated by the difference detecting portion 72, the ratio of the pixels in the corresponding positions on the images B1 and B2 may be calculated. In this case, the ratio is close to 1, when the object is not moved whereas the ratio is deviated from 1, when the object is moved. Accordingly, the first and second noise reduction processing may be carried out according to the ratio.

Though, in the second embodiment described above, the images B1 and B2 represented by B1 and B2 data are used, Y1 image and Y2 image may be used instead of the images B1 and B2. Further, the Cb1 image and the Cb2 image or the Cr1 image and the Cr2 image may be used. Even the G1 image and the G2 image or the B1 image and the B2 image may be used. In this case, the threshold value Th1 may be changed according to the level of the signal of each image.

Figure 12:
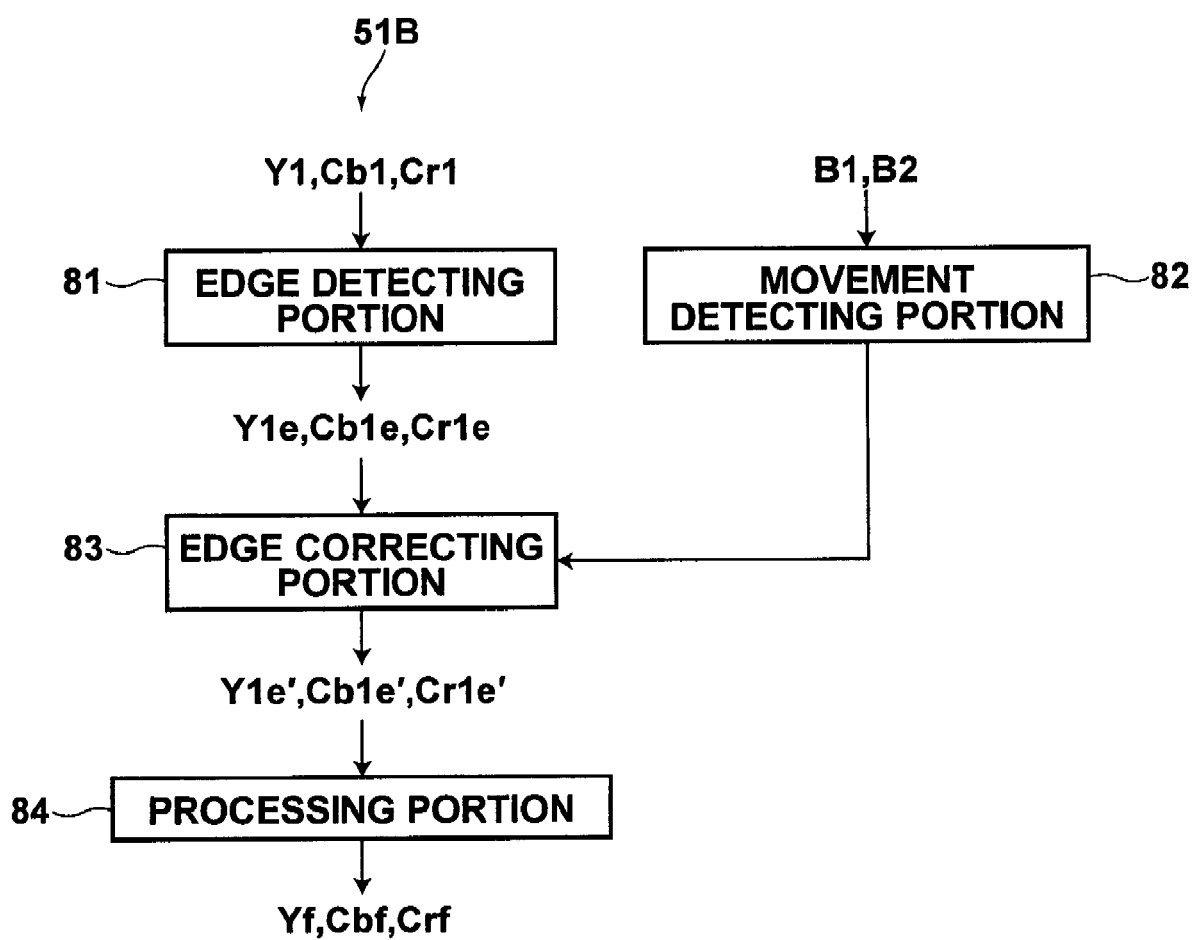
FIG. 12 is a block diagram showing the noise reduction portion of the third embodiment of the present invention.

A third embodiment of the present invention will be described, hereinbelow. Since the third embodiment differs from the first embodiment only in the structure of the noise reduction portion, the noise reduction portion will only be described in the following description. FIG. 12 is a block diagram showing the noise reduction portion of the third embodiment of the present invention. As shown in FIG. 12, into the noise reduction portion 51B in the third embodiment, Y1 data, Cb1 data, and Cr1 data obtained by YC-processing the first image S1, Y2 data, Cb2 data, and Cr2 data obtained by YC-processing the second image S2, and color data B1 of the B of the first image S1 and color data B2 of the B of the second image S2 before the YC-processing are input and the third embodiment comprises an edge detecting portion 81, a movement detecting portion 82, an edge correcting portion 83 and a processing portion 84.

Figure 13:
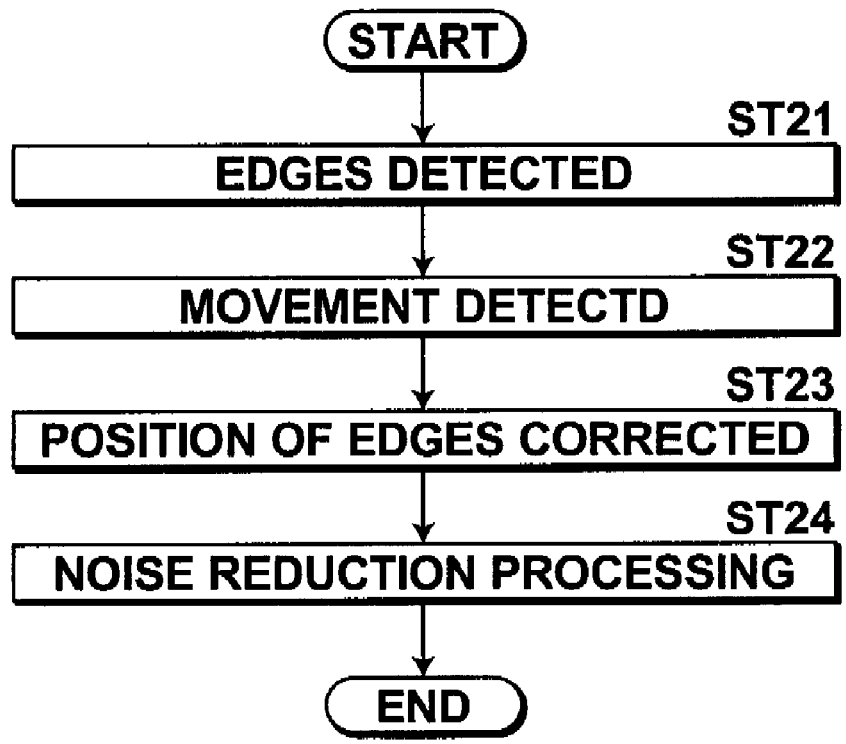
FIG. 13 is a flow chart showing the noise reduction processing to be executed in the third embodiment of the present invention.

The noise reduction processing executed by the noise reduction portion 51B in the third embodiment will be described, hereinbelow. FIG. 13 is a flow chart showing the noise reduction processing to be executed in the third embodiment of the present invention. In response to input of Y1 data, Cb1 data and Cr1 data and Y2 data, Cb2 data and Cr2 data, and color data B1 and color data B2 into the noise reduction portion 51B, the processing is started, and the edge detecting portion 81 detects the edges contained in Y1 image, Cb1 image, and Cr1 image to generate edge images Y1e, Cb1e, and Cr1e (step ST21). The edges contained in the respective images can be detected by carrying out filtering with a high-pass filter as in the first embodiment.

On the other hand, the movement detecting portion 82 detects movement of B1 image and B2 image represented by B1 and B2 data (step ST22). Specifically, the movement detecting portion 82 detects the points corresponding to each other on the B1 image and the B2 image and detects movement vectors representing the amount of movement and the direction of movement of the corresponding points as movements thereof. For this purpose, known techniques such as that disclosed in "Shape and Motion from Image Streams: a Factorization Method-Part 3, Detection and Tracking of Point Features", C. Tomasi and T. Kanade, Technical Report CMU-CS-91-132, 1991 and "Shape and Motion from Image Streams: a Factorization Method, Full Report on the Orthographic Case", C. Tomasi and T. Kanade, CORNELL TR 92-1270 and CARNEGIE MELLON CMU-CS-92-104, 1992 can be used. The movement vectors are detected over the all the pixels in B1 image. That the movement is detected by the use of the B1 image and the B2 image is for the same reason as in the second embodiment.

Then the edge correcting portion 83 corrects the position of the edges in the edge images Y1e, Cb1e, and Cr1e on the basis of the detected movement (step ST23). Since the first and second images S1 and S2 are photographed with the infrared ray cut filter 16 switched on the optical axis of the image taking means and there is generated a time lag between the photographings, the object can be moved between the first and second images. For example, when a person waving his hand is the object, his hand is different in the position between the first and second images S1 and S2 as shown in FIG. 11 described above.

Figure 14:
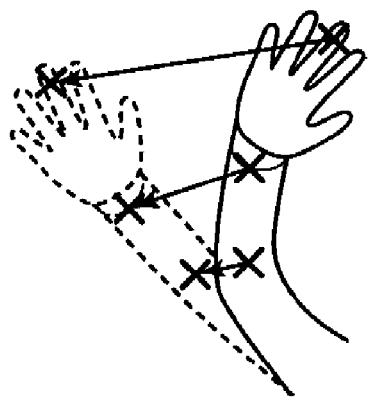
FIG. 14 is a view showing the movement vector.

In the case of the first and second images S1 and S2 shown in FIG. 11, the movement vectors on the first image is 0 in the pixels other than those corresponding to the hand and is larger according to the difference in position of the corresponding points on the first and second images as shown in FIG. 14 in the pixels corresponding to the hand. Accordingly, the edge correcting portion 83 corrects the position of the edges in the edge images Y1e, Cb1e, and Cr1e to conform to that in the images Y2, Cb2, and Cr2.

Then the processing portion 84 carries out the noise reduction processing on the images Y2, Cb2, and Cr2 respectively represented by Y2, Cb2, and Cr2 data to avoid the edges on the basis of corrected edge images Y1e', Cb1e', and Cr1e' (step ST24). Thereafter the noise reduction processing is ended.

In the third embodiment, the position of edges in the edge images Y1e, Cb1e and Cr1e is corrected on the basis of the movement detected by the movement detecting portion 82 and the noise reduction processing is carried out on the images Y2, Cb2, and Cr2 to avoid the edges in corrected positions. Accordingly, while the edges are accurately detected by the use of the first image S1, the noise reduction processing can be carried out to avoid the edges contained in the second image S2 even if the object is moved. As a result, a processed image in which the noises are reduced can be obtained without blurring the edges.

Though, in the third embodiment described above, the images B1 and B2 represented by B1 and B2 data are used, Y1 image and Y2 image may be used instead of the images B1 and B2. Further, the Cb1 image and the Cb2 image or the Cr1 image and the Cr2 image may be used. Even the G1 image and the G2 image or the R1 image and the R2 image may be used.

Though, in the first to third embodiments, the edge detecting portion 61, 71 or 81 detects the edges contained in Y1 and Y2 images, Cb1 and Cb2 images, and Cr1 and Cr2 images, when e.g., the edges are detected from the Y1 and Y2 images only to generate the edge images Y1e and Y2e and the noise reduction processing is carried out, the noise reduction processing may be carried out on the Y2 image, Cb2 image, and the Cr2 image with reference to only the edge images Y1e and Y2e.

Though, in the first to third embodiments, the first and second photographings are carried out at the same shutter speed, the first and second photographings may be carried out at different shutter speeds taking into account the difference in amount of light reaching the CCD 18 due to the presence and absence of the infrared ray cut filter 16. In this case in the second embodiment, the threshold value Th1 should be changed according to the level of the signal of each image.

Further, though, in the first to third embodiments, the noise reduction processing is carried out after the YC processing, the noise reduction processing may be carried out on the RGB color images before the YC processing. In this case, in the first and third embodiments, the edges should be detected from the RGB color images forming the first image S1, and the noise reduction processing should be carried out on the RGB color images of the second image S2. In the second embodiment, the edges should be detected from the RGB color images forming the first and second images S1 and S2, and the noise reduction processing should be carried out on the RGB color images of the second image S2.

Though the image processing system of the present invention is applied to a digital camera in the above description, only the noise reduction system where the noise reduction is carried out as the systems described above may be provided. Further, a computer program which causes a computer to function as the edge detecting portion, noise reduction portion, difference detecting portion or the movement detecting portion and to execute the processing such as shown in FIG. 4, 9 or 13 is included in the present invention. Further, a computer-readable medium on which such a program is recorded is included in the present invention.

What is claimed is:
1. An image processing apparatus comprising
   an edge detecting means which detects edges as first and second edge information contained in first and second images representing the same object, one being obtained by photographing without an infrared ray cut filter, the other being obtained by photographing with an infrared ray cut filter, a difference detecting means which detects a difference of the images at the corresponding points in the first and second images and a noise reduction means which carries out noise reduction processing on the second image according to the first and second edge information and existence of the difference of the images in the first image, and obtains a processed image, wherein the image data representing the first and second images comprises RGB data, the edge detecting means comprises means for detecting the edges from an image represented by at least one of brightness data and two color difference data generated from the RGB data.

2. An image processing apparatus as defined in claim 1 in which the noise reduction means comprises a means which carries out the noise reduction processing on the second image to avoid the edges based on the first edge information where it may be considered that there is no difference of the first and second images in the second image and carries out the noise reduction processing on the second image to avoid the edges based on the second edge information where it may be considered that there is a difference of the first and second images in the second image.

3. An image processing apparatus as defined in claim 1 in which the difference detecting means comprises a means which detects the absolute value of the difference of the pixels at the corresponding points in the first and second images as the difference of the images.

4. An image processing apparatus as defined in claim 1 in which the first and second images are obtained at the same shutter speed.

5. An image processing apparatus as defined in claim 4 in which the image data representing the first and second images comprises RGB data, the difference detecting means comprises a means which detects the difference on the basis of the B color data.

6. An image taking apparatus comprising
an image taking means which obtains an image by photographing,
a filter switching means which moves into and away from the optical axis of the image taking means,
a control means which controls the image taking means and the filter switching means to obtain first and second images representing the same object, one being obtained by photographing without an infrared ray cut filter, the other being obtained by photographing with the infrared ray cut filter, and
an image processing apparatus defined in claim 1.

7. An image processing method comprising the steps of
detecting edges as first and second edge information contained in first and second images representing the same object, one being obtained by photographing without an infrared ray cut filter, the other being obtained by photographing with the infrared ray cut filter,
detecting a difference of the images at the corresponding points in the first and second images and
carrying out noise reduction processing on the second image according to the first and second edge information and existence of the difference of the images in the first image, and
obtaining a processed image,
and two color difference data generated from the RGB data" to "wherein the image data representing the first and second images comprises RGB data, the edges are detected from an image represented by at least one of brightness data and two color difference data generated from the RGB data".

8. A non-transitory computer-readable medium on which is recorded procedure of an image processing method comprising the steps of
detecting edges as first and second edge information contained in first and second images representing the same object, one being obtained by photographing without an infrared ray cut filter, the other being obtained by photographing with the infrared ray cut filter,
detecting a difference of the images at the corresponding points in the first and second images and
carrying out noise reduction processing on the second image according to the first and second edge information and existence of the difference of the images in the first image, and
obtaining a processed image,
wherein the image data representing the first and second images comprises RGB data, the edges are detected from an image represented by at least one of brightness data and two color difference data generated from the RGB data.

9. An image processing apparatus comprising
an edge detecting means which detects edges as first and second edge information contained in first and second images representing the same object, one being obtained by photographing without an infrared ray cut filter, the other being obtained by photographing with the infrared ray cut filter,
a difference detecting means which detects a difference of the images at the corresponding points in the first and second images and
a noise reduction means which carries out noise reduction processing on the second image according to the first and second edge information and existence of the difference of the images in the first image, and obtains a processed image,
wherein the first and second images are obtained at the same shutter speed, and
wherein the image data representing the first and second images comprises RGB data, and the difference detecting means comprises a means which detects the difference on the basis of the B color data.

10. An image processing apparatus as defined in claim 9 in which the noise reduction means comprises a means which carries out the noise reduction processing on the second image to avoid the edges based on the first edge information where it may be considered that there is no difference of the first and second images in the second image and carries out the noise reduction processing on the second image to avoid the edges based on the second edge information where it may be considered that there is a difference of the first and second images in the second image.

11. An image processing apparatus as defined in claim 9 in which the difference detecting means comprises a means which detects the absolute value of the difference of the pixels at the corresponding points in the first and second images as the difference of the images.

12. An image processing method comprising the steps of
detecting edges as first and second edge information contained in first and second images representing the same object, one being obtained by photographing without an infrared ray cut filter, the other being obtained by photographing with the infrared ray cut filter,
detecting a difference of the images at the corresponding points in the first and second images and carrying out noise reduction processing on the second image according to the first and second edge information and existence of the difference of the images in the first image, and obtaining a processed image, wherein the first and second images are obtained at the same shutter speed, and wherein the image data representing the first and second images comprises RGB data, and the difference of the images is detected on the basis of the B color data.

13. A non-transitory computer-readable medium on which is recorded procedure of an image processing method comprising the steps of detecting edges as first and second edge information contained in first and second images representing the same object, one being obtained by photographing without an infrared ray cut filter, the other being obtained by photographing with the infrared ray cut filter, detecting a difference of the images at the corresponding points in the first and second images and carrying out noise reduction processing on the second image according to the first and second edge information and existence of the difference of the images in the first image, and obtaining a processed image, wherein the first and second images are obtained at the same shutter speed, and wherein the image data representing the first and second images comprises RGB data, and the difference of the images is detected on the basis of the B color data.

* * * * *